United States Patent
Laine et al.

(10) Patent No.: US 12,496,909 B2
(45) Date of Patent: Dec. 16, 2025

(54) METHOD FOR CONTROLLING A VEHICLE BRAKE SYSTEM

(71) Applicant: VOLVO TRUCK CORPORATION, Gothenburg (SE)

(72) Inventors: Leo Laine, Härryda (SE); Mattias Åsbogård, Mölnlycke (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 283 days.

(21) Appl. No.: 17/758,760

(22) PCT Filed: Jan. 15, 2020

(86) PCT No.: PCT/EP2020/050848
§ 371 (c)(1),
(2) Date: Jul. 13, 2022

(87) PCT Pub. No.: WO2021/144008
PCT Pub. Date: Jul. 22, 2021

(65) Prior Publication Data
US 2023/0062199 A1    Mar. 2, 2023

(51) Int. Cl.
*B60L 7/26* (2006.01)
*B60T 8/1761* (2006.01)
*B60T 8/1763* (2006.01)

(52) U.S. Cl.
CPC ............ *B60L 7/26* (2013.01); *B60T 8/17616* (2013.01); *B60T 8/17636* (2013.01);
(Continued)

(58) Field of Classification Search
CPC .. Y10S 903/947; B60L 7/26; B60L 2240/423; B60L 7/18; B60L 7/24;
(Continued)

(56) References Cited

U.S. PATENT DOCUMENTS

| 4,962,969 A | 10/1990 | Davis |
| 5,378,053 A | 1/1995 | Patient et al. |

(Continued)

FOREIGN PATENT DOCUMENTS

| CN | 1829621 A | 9/2006 |
| CN | 101786452 A | 7/2010 |

(Continued)

OTHER PUBLICATIONS

European Communication under Rule 71(3) dated Sep. 15, 2023 in corresponding European Patent Application No. 20701694.0, 34 pages.

(Continued)

*Primary Examiner* — Khoi H Tran
*Assistant Examiner* — Tanner L Cullen
(74) *Attorney, Agent, or Firm* — Jeffri A. Kaminski; Venable LLP (57) ABSTRACT

A method for controlling a vehicle brake system of a heavy duty vehicle, the brake system comprising a service brake system and an electrical machine brake system. The method includes determining a total brake torque request for braking a wheel of the vehicle, obtaining a brake torque capability of the electrical machine, determining if the total brake torque request exceeds the brake torque capability of the electrical machine, and if the total brake torque request exceeds the brake torque capability of the electrical machine but is below a threshold level, applying a baseline brake torque by the service brake system, wherein the baseline brake torque is configured to compensate for a difference between total brake torque request and brake torque capability of the electrical machine, and controlling wheel slip by the electrical machine brake system.

15 Claims, 5 Drawing Sheets

(52) U.S. Cl.
CPC ..... *B60L 2240/423* (2013.01); *B60L 2240/80* (2013.01); *B60T 2210/12* (2013.01); *B60T 2250/00* (2013.01); *B60T 2270/10* (2013.01); *B60T 2270/602* (2013.01); *B60T 2270/604* (2013.01)

(58) Field of Classification Search
CPC .... B60L 2240/80; B60L 3/108; B60T 13/746; B60T 13/586; B60T 8/17616; B60T 8/17636; B60T 8/1763; B60T 2270/10; B60T 2270/602; B60Y 2300/89; B60Y 2200/148; B60W 20/14
See application file for complete search history.

(56) References Cited

U.S. PATENT DOCUMENTS

| | | | |
|---|---|---|---|
| 5,707,115 | A | 1/1998 | Bodie et al. |
| 6,231,134 | B1* | 5/2001 | Fukasawa ............ B60T 13/586 303/3 |
| 6,687,593 | B1 | 2/2004 | Crombez et al. |
| 7,410,023 | B2 | 8/2008 | Crombez |
| 8,862,356 | B2 | 10/2014 | Miller |
| 9,156,358 | B2 | 10/2015 | Yu et al. |
| 9,676,280 | B2 | 6/2017 | Ruth et al. |
| 2008/0116743 | A1 | 5/2008 | Jeon et al. |
| 2009/0069149 | A1 | 3/2009 | Okumura et al. |
| 2011/0148184 | A1* | 6/2011 | Suzuki ................. B60T 8/3255 303/3 |
| 2012/0109479 | A1 | 5/2012 | Ganley et al. |
| 2012/0319464 | A1* | 12/2012 | Lloyd .................... B60T 17/22 303/3 |
| 2013/0218435 | A1 | 8/2013 | Nakamura |
| 2013/0289809 | A1* | 10/2013 | Treharne ............. B60L 3/0046 180/65.285 |
| 2014/0257664 | A1 | 9/2014 | Arbitmann et al. |
| 2014/0277983 | A1 | 9/2014 | Bayar et al. |
| 2016/0107540 | A1 | 4/2016 | Zhang et al. |
| 2016/0214486 | A1* | 7/2016 | Suzuki .................... B60L 50/52 |
| 2016/0272176 | A1* | 9/2016 | Furuyama ............ B60T 8/1761 |
| 2016/0355167 | A1 | 12/2016 | Erban et al. |
| 2017/0096070 | A1* | 4/2017 | Hyuan ...................... B60L 7/26 |
| 2018/0201240 | A1* | 7/2018 | Masuda .................. B60T 13/74 |
| 2018/0215272 | A1 | 8/2018 | Vitullo et al. |
| 2018/0361856 | A1* | 12/2018 | Zhao ..................... B60W 10/02 |
| 2020/0171956 | A1* | 6/2020 | Park .................... B60L 15/2027 |

FOREIGN PATENT DOCUMENTS

| | | | |
|---|---|---|---|
| CN | 102501779 | A | 6/2012 |
| CN | 102975702 | A | 3/2013 |
| CN | 104364135 | A | 2/2015 |
| CN | 104417545 | A | 3/2015 |
| CN | 105151962 | A | 12/2015 |
| CN | 105492244 | A | 4/2016 |
| CN | 107531237 | A | 1/2018 |
| CN | 109070877 | A | 12/2018 |
| CN | 109591819 | A | 4/2019 |
| CN | 109955727 | A | 7/2019 |
| CN | 110040126 | A | 7/2019 |
| CN | 110234553 | A | 9/2019 |
| DE | 102010027896 | A1 | 11/2010 |
| DE | 102010003076 | A1 | 8/2011 |
| DE | 112010005337 | T5 | 12/2012 |
| DE | 102013214806 | A1 | 9/2014 |
| DE | 102019105252 | A1 | 9/2019 |
| EP | 3030451 | A2 | 6/2016 |
| JP | H06153312 | A | 5/1994 |
| JP | 2006204073 | A | 8/2006 |
| KR | 1020140069280 | A | 6/2014 |
| WO | 2014029548 | A1 | 2/2014 |

OTHER PUBLICATIONS

International Search Report and Written Opinion in corresponding International Application No. PCT/EP2020/050848 mailed Oct. 5, 2020 (16 pages).
International Preliminary Report on Patentability in corresponding International Application No. PCT/EP2020/050848 mailed Mar. 2, 2021 (7 pages).
European Communication of a Notice of Opposition dated Nov. 12, 2024 in corresponding European Application No. 20701694.0, 42 pages.
ECE-R13—legal vehicle regulation; Jan. 14, 2008, 244 pages.
Grundlagen der Elektromobilitat; Basics of electromobility, 213 pages.
Altindemir et al. „Development of an Auxiliary Pressurized Hybrid BrakeSystem for a Parallel Hybrid Electric Commercial Van Artikel in SAEInternational 2009.
Wikipedia, "Antiblockiersystem" Host: Wikipedia Nov. 1, 2020, 20 pages.
Chinese Office Action dated Oct. 23, 2024 in corresponding Chines Patent Application No. 202080092615.5, 22 pages.
Korean Office Action dated Mar. 27, 2024 in corresponding Korean Patent Application No. 10-2022-7028063, 16 pages.
Chinese Office Action dated Mar. 14, 2024 in corresponding Chinese Patent Application No. 202080093873.5, 16 pages.
Japan Office Action dated Apr. 2, 2024 in corresponding Japan Patent Application No. 2022-542398, 7 pages.

* cited by examiner

FIG. 9

METHOD FOR CONTROLLING A VEHICLE BRAKE SYSTEM

CROSS-REFERENCE TO RELATED APPLICATIONS

This application is a U.S. National Stage application of PCT/EP2020/050848, filed Jan. 15, 2020 and published on Jul. 22, 2021, as WO 2021/144008, all of which is hereby incorporated by reference in its entirety.

TECHNICAL FIELD

The present disclosure relates to systems for decelerating heavy duty vehicles, and in particular to methods for controlling brake blending between one or more electrical machines and a service brake system. The invention can be applied in heavy-duty vehicles, such as trucks and construction equipment, but is not restricted to this particular type of vehicle.

BACKGROUND

Most heavy duty vehicles comprise service brakes which are arranged to decelerate, i.e., brake, the vehicle during operation. The service brakes on heavy duty vehicles are normally friction brakes, such as disc brakes or drum brakes.

Electrically powered vehicles comprise one or more electrical machines arranged to power the vehicle. These electrical machines are often also capable of generating a decelerating force. Such braking may be regenerative in the sense that energy may be generated from the braking, which energy ran be stored in an electrical storage device, such as a battery. A combination of braking by more than one type of brake, such as the service drakes and the electrical machines, is known as brake blending it is challenging from a control perspective to combine different types of braking systems in an efficient and robust manner. US 2013/0218435 A1 discloses methods and devices for efficient brake blending of service brakes and regenerative brakes. The approach proposed in US 2013/0218435 A1 is to use the regenerative brake system for light to moderate braking force, and to rely on the service brake system for more moderate braking US 2018/0361856 A1 discloses methods and devices using brake blending.

However, there is a need for more refined methods for brake blending.

SUMMARY

It is an object of the present disclosure to provide improved methods and control systems for brake blending. This object is at least in part obtained by a method for controlling a vehicle brake system of a heavy duty vehicle. The brake system comprises a service brake system and an electrical machine brake system. The method comprises determining a total brake torque request for braking a wheel of the vehicle, obtaining a brake torque capability of the electrical machine, determining if the total brake torque request exceeds the brake torque capability of the electrical machine, and if the total brake torque request exceeds the brake torque capability of the electrical machine but is below a threshold level, applying baseline brake torque by the service brake system. The baseline brake torque is configured to compensate for a difference between the total brake torque request and brake torque capability of the electrical machine. The method also comprises controlling wheel slip by the electrical machine brake system if the total brake torque request is below the threshold level.

This way slip control is efficiently handled mainly by the electrical machine during a majority of braking operations. The brake torque capability of the electrical machine is monitored, and a torque controlled (pre-determined torque level) braking by the service brake system is used to ensure that the brake torque requests can be met. This means that the electrical machine controls wheel slip, while the service brake system slip controller is not active, as long as the brake torque requests are not above the threshold level. This simplifies control and allows for an efficient operation by, e.g., a regenerative deceleration system, since the service brake slip control system does not need to be taken into account in terms of, e.g., coordination and joint wheel slip control. Hard braking is handled solely by the service brake system, which ensures safe vehicle operation and reduced control response time since the electrical machine braking is deactivated in response to a high brake torque request.

According to some aspects the electrical machine is able to provide a higher torque, a peak torque, for a limited amount of time. Thus, according to some aspects, there is a time dependence associated with the brake torque capability of the electrical machine, and the total brake torque request comprises a time duration. The ability of an electric machine to generate high torques for a limited amount of time can be exploited in an efficient manner by the techniques proposed herein.

According to aspects, the baseline brake torque is determined as a difference between the total brake torque request and the brake torque capability of the electrical machine with an added margin torque value. The added margin torque value adds a safety margin to the operation, thus ensuring that brake torque requests can be met with high probability. The added margin torque value may be selected to be between 0.1 and 0.3 times the brake torque capability of the electrical machine, and preferably 0.2 times the brake torque capability of the electrical machine, i.e., a relative margin value. The margin value can also be determined relative to other quantities in the system, or be an absolute measure.

According to some aspects, the method comprises applying a baseline brake torque equal to zero in case the total brake torque request is below the brake torque capability of the electrical machine. This means that the electrical machine handles all braking as long as the electrical machine has braking capability enough to handle the brake torque request.

According to some other aspects, as mentioned above, the method comprises braking the vehicle solely by the service brake system and controlling wheel slip solely by the service brake system in case the total brake torque request is above the threshold level. The service brake system may be configured to generate larger braking torques in a safe manner compared to the electrical machine. Thus, by using the service brake system solely for generating hard braking adds additional safety to the overall braking system. The threshold level may, e.g., correspond to a vehicle acceleration with magnitude above 0.5 g.

According to aspects, the method also comprises determining the total brake torque request in dependence of an estimated surface friction coefficient R. This means that, e.g., more reasonable brake torque requests are sent into the system.

According to some aspects, the method comprises determining the brake torque capability of the electrical machine in dependence of a battery state and/or in dependence of a resistor arranged to absorb surplus energy from regenerative braking.

According to some aspects, the method comprises configuring a wheel slip limit of the service brake above a wheel slip limit of the electrical machine. This way the service brake acts as a safety back-up to the electrical machine during propulsion. For instance, if the electrical machine is not able to limit wheel slip as configured at the lower level, and the wheel slip increases above the wheel slip limit imposed on the electrical machine, then the service brake system will eventually trigger wheel slip control as the higher wheel slip limit of the service brake system is also breached.

There is also disclosed herein control units, computer programs, computer readable media, computer program products, brake systems, propulsion systems, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1A:
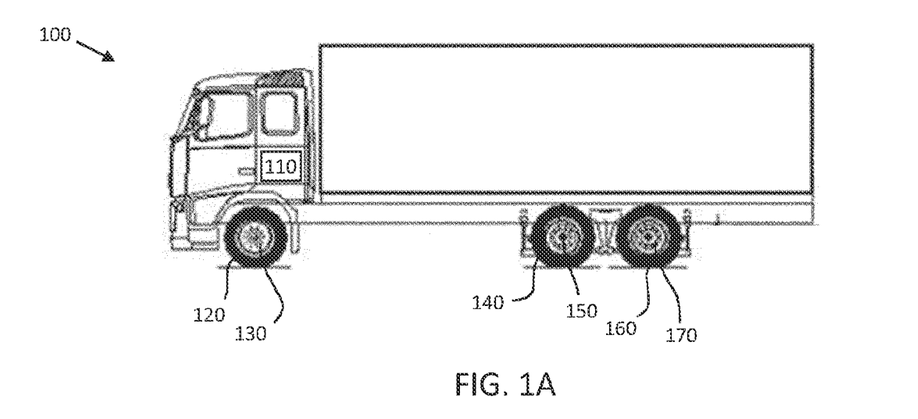
FIGS. 1A-B schematically illustrate some example heavy duty vehicles.
Figure 1B:
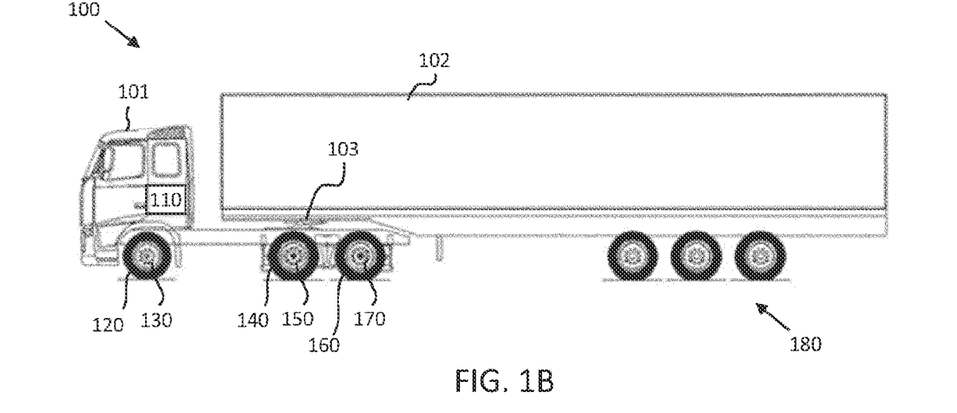

FIGS. 1A and 1B illustrate example vehicles 100 for cargo transport where the herein disclosed techniques can be applied with advantage. FIG. 1A shows a truck supported on wheels 120, 140, and 160, at least some of which are driven wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

Each wheel, or at least a majority of the wheels on the vehicle, is associated with a respective wheel service brake 130, 150, 160 (trailer unit wheel brakes are not indicated in FIGS. 1A-1C). This wheel service brake may, e.g., be a pneumatically actuated disc brake or drum brake. The wheel brakes are controlled by brake controllers. Herein, the terms brake controller, brake modulator, and wheel end module will be used interchangeably. They are all to be interpreted as a device which controls applied braking force on at least one wheel of a vehicle, such as the vehicle 100. Each of the wheel brake controllers is communicatively coupled to a control unit 110, allowing the control unit to communicate with the brake controllers, and thereby control vehicle braking. This control unit may potentially comprise a number of sub-units distributed across the vehicle, or it can be a single physical unit. The control unit 110 may, e.g. perform vehicle motion management functions such as allocating brake force between wheels to maintain vehicle stability and keep wheel slip at acceptable levels. Wheel brake force can also be distributed and/or controlled for optimization of electrical machine usage.

Figure 2:
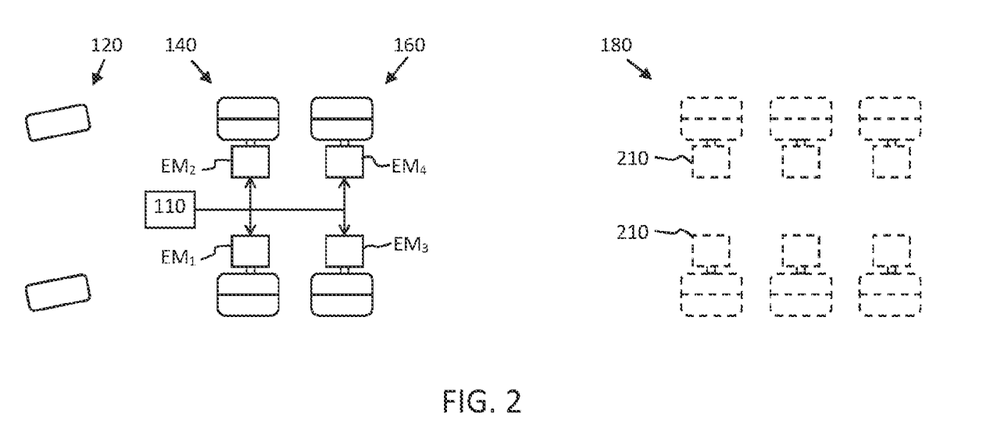
FIG. 2 shows an example vehicle brake/propulsion system.

Some of the wheels on the vehicles 100 are driven by electrical machines. FIG. 2 shows an example drive arrangement where two axles comprise wheels that are driven by electrical machines $EM_1$-$EM_4$. Each of the electrical machines $EM_1$-$EM_4$ may generate both acceleration forces as well as deceleration (braking) forces in a known manner. For instance, an electrical machine may be configured as a regenerative brake which produces electrical power during vehicle retardation. The driven wheels also comprise service brakes $SB_1$-$SB_4$, such as friction brakes, configured to reduce wheel speed in a known manner.

The electrical machine system can be designed as an endurance brake system by adding a resistor to the set-up. This means that when energy sources, i.e., batteries, have reached maximum state of charge (SOC) the braking power from the motors can instead be run through the resistor where heat is generated from the braking of the motors. This way brake force can be generated by the electrical machine even when the electrical machine power source is at full charge, since the resistor is able to absorb surplus energy from the regenerative braking.

FIG. 2 also shows the optional set of trailer wheels 180, which normally are associated with a corresponding set of service brakes. Towed units, such as semi-trailers and the like, may be equipped with a similar layout comprising electrical machines 210 and service brakes (not shown in FIG. 2) on each wheel or on a sub-set of wheels.

The control unit 110 is, according to some aspects, configured to perform vehicle motion management. This management comprises distributing traction forces between the electrical machines, and also braking forces.

Figure 3:
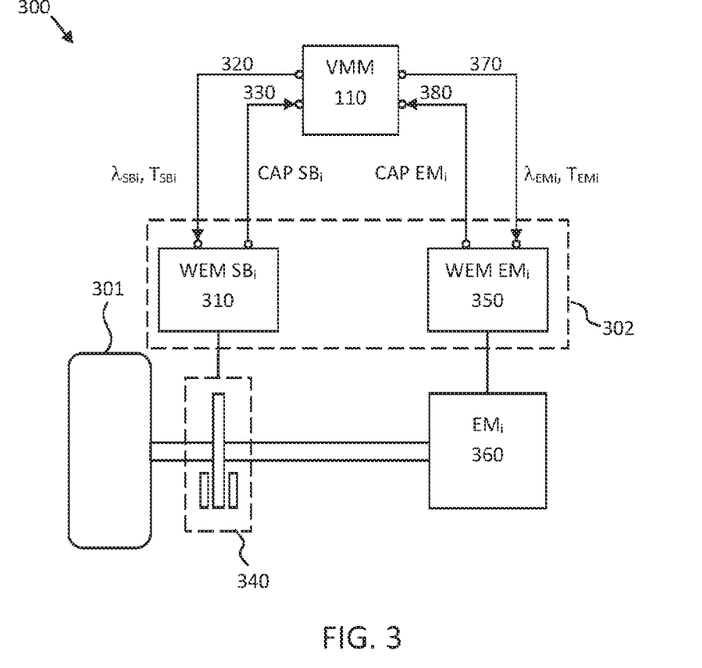
FIG. 3 shows details of an example vehicle brake/propulsion system.

FIG. 3 illustrates a brake control system 300 for a wheel 301, such as one of the wheels 140, 160. The brake control system 300 comprises a service brake wheel end module (WEM SB$_i$) 310 arranged to control wheel braking by a service brake actuator 340, here exemplified by a disc brake, and also an electrical machine EM$_i$ 360 arranged to power the wheel 301 and also to apply braking force to reduce wheel rotational velocity. An electrical machine wheel end module (WEM EM$_i$) 350 is arranged to control the electrical machine 360. It is appreciated that the two WEMs may be comprised in a single physical unit 302 or configured as separate physical units.

The vehicle control unit 110, here shown as a Vehicle Motion Management (VMM) system is arranged to control operations by the two wheel end modules 310, 350. The control is based on transmitted torque requests T$_{SBi}$ 320 and T$_{EMi}$ 370, as well as imposed wheel slip limits $\lambda_{SBi}$ and $\lambda_{EMi}$.

Longitudinal wheel slip $\lambda$ may, in accordance with SAE J670 (SAE Vehicle Dynamics Standards Committee Jan. 24, 2008) be defined as $$\lambda = \frac{R\omega - v_x}{\max(|R\omega|, |v_x|)}$$

where R is an effective wheel radius in meters, $\omega$ is the angular velocity of the wheel, and v$_x$ is the longitudinal speed of the wheel (in the coordinate system of the wheel). Thus, $\lambda$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition.

The vehicle control unit 110 maintains information on v$_x$ (in the reference frame of the wheel), while a wheel speed sensor or the like can be used to determine $\omega$. For the WEM, a rotational speed sensor in the electrical machine itself could also be used to determine $\omega$, in which case gear ratios and the like may also need to be accounted for.

Notably, in the following, when limits on wheel slip are discussed, it is the magnitude or absolute value of the wheel slip which is limited. I.e., an increased wheel slip limit may either refer to a larger positive allowed wheel slip or a smaller negative allowed wheel slip. The present disclosure mainly considers braking, i.e., the wheel slip is normally negative herein, since v$_x$>R$\omega$, during braking.

Modern service brake systems and also some more recent electrical machines are capable of fine grained slip control. For instance, some modern brake controllers are able to keep wheel slip $\lambda$ within say +/−0.02 of some nominal value.

The vehicle control unit 110, i.e., the VMM system, sends brake requests comprising, e.g., requested brake torque and wheel slip magnitude limit, and receives back capability data CAP SB$_i$ 330 and CAP EM$_i$ 380 related to the current capabilities of the wheel end module. The capability data may comprise, e.g., current measured wheel slip, peak measured wheel slip (over some time period), current braking capability in terms of, e.g., brake torque, and in some cases also estimated road friction coefficients.

The capability in terms of braking may be associated with a continuous capability which is a torque that can be delivered over an extended period of time, and a peak capability which is a capability that can be delivered over a limited period of time. This will be discussed in more detail below in connection to FIG. 6. The capability data CAP SB$_i$ 330 and CAP EM$_i$ 380 may comprise continuous and peak torque capabilities, and also a time duration value indicating for how long the peak torque can be delivered. This time period may furthermore decrease as a function of delivered torque, e.g., if the electrical machine 380 is used for deceleration such that it heats up, the time duration for which the peak torque can be delivered is likely to decrease. If the electrical machine has not been subject to high load for some time, it is likely that it is able to deliver peak torque for a longer time duration compared to when it is operating at an increased temperature. Thus, time periods associated with different levels of torque can be used with advantage to increase controllability of the vehicle 100.

A WEM controls braking according to the requested brake torque while keeping wheel slip magnitude below the set wheel slip magnitude limit. This is made possible by the data supplied from the control unit 110 on, e.g., vehicle speed in the frame of reference of the wheel. If wheel slip magnitude exceeds the set slip limit, a slip control strategy which may comprise reducing the wheel torque generated in the brake system is activated such that the wheel recovers to a slip value equal to or less than the set wheel slip magnitude limit. The capability message CAP SB$_i$ 330 or CAP EM$_i$ 380 may be continuously updated in response to changes in operating conditions. For instance, the total capability for a wheel is always limited by the current road friction. This is because achievable longitudinal force is limited by road friction and tyre normal force in a known manner.

The slip control function can be incorporated in the VMM 110 or into one or both WEMs 310, 350 or a combination of VMM and WEMs. According to some aspects, the slip control loop in the VMM associated with the electrical machine uses one slip limit and the corresponding WEM uses a larger one. This way the WEM acts as a safety net if VMM fails to prevent excessive wheel lock.

Herein, a slip control loop is interpreted broadly to mean a slip control system arranged to regulate wheel slip in some way. A slip control loop does not necessarily involve feedback. Normally, the brake torque is requested based on current road friction conditions. For instance, the total requested brake torque may be determined as the smallest value of a preferred brake torque determined based on driving scenario, and a maximum achievable torque given the current road friction conditions.

Figure 4:
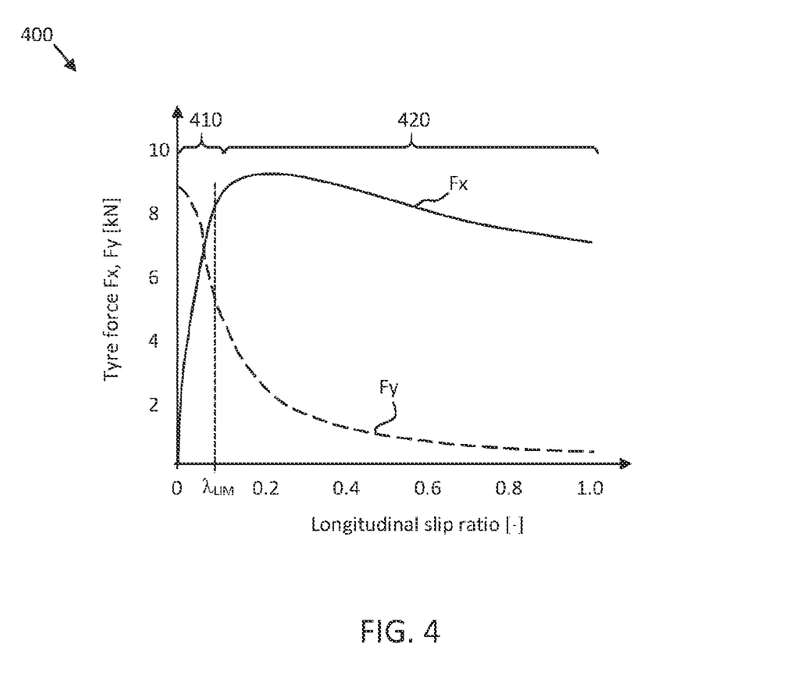
FIG. 4 is a graph illustrating tyre force vs. slip ratio.

FIG. 4 is a graph showing achievable tyre force as function of wheel slip. The longitudinal obtainable tyre force Fx shows an almost linearly increasing part 410 for small wheel slips, followed by a part 420 with more non-linear behaviour for larger wheel slips. The obtainable lateral tyre force Fy decreases rapidly even at relatively small longitudinal wheel slips. It is desirable to maintain vehicle operation in the linear region 410, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a WEM.

There are at least three possibilities for implementing a slip control system for the EM 360, which options can be combined or used separately.

In a first option, with reference to FIG. 3, the slip controller system is implemented or at least partly comprised within the VMM 110. Torque requests T$_{EMi}$ are then sent to the WEM EM$_i$ 350 in dependence of current wheel slip.

In a second option, the main wheel slip controller for the EM 360 is comprised in the WEM $EM_i$ 350, and the VMM sends torque request and slip limits (as it does for the service brakes 310/340). The WEM $EM_i$ 350 then modifies the torque request into an applied torque in dependence of current wheel slip and updates the capability message CAP $EM_i$.

In a third option, the VMM 110 does part of the EM slip control loop and sends wheel speed requests to the WEM $EM_i$ 350 when the slip limit is breached. This way the WEM $EM_i$ 350 can do fast control on the electrical machine rotational speed, but the actual slip calculation is mainly performed by the VMM 110.

In general, the techniques related to brake blending discussed herein can be applied also to trailer units comprising electrical machines and service brakes.

According to the techniques disclosed herein, the VMM 110 optionally decides which brake actuator out of the electrical machine and the service brake that is to perform slip control. The other brake actuator of the electrical machine and the service brake then functions as a slip control back-up configured with a higher slip limit compared to the actuator performing the slip control.

Control of braking systems like that shown in FIG. 3 comprising more than one actuator, such as brake blending using both a service brake system as well as by one or more electrical machines is complicated, at least partly since there are now two different actuators trying to control the same wheel. Slip control may be adversely affected in such systems, since, when wheel slip occurs, both systems may try to limit the slip, possibly with different control time constants. This may result in too large reductions in brake torque, or even in oscillating behavior.

To simplify wheel slip control in systems with more than one brake actuator and more than one unit able to perform slip control, it is proposed herein to apply a baseline torque by the service brake system and let the electrical machines control wheel slip, as long as the total requested torque by the VMM 110 does not exceed a threshold torque value corresponding to hard braking. This threshold value may, e.g., be on the order of −0.5 g or so, where 'g' is the net longitudinal acceleration that is imparted to objects due to the combined effect of gravitation (from distribution of mass within Earth) and the centrifugal force (from the Earth's rotation). The baseline torque level may be configured to change slowly over time, or even be constant over some time period.

Figure 5A:
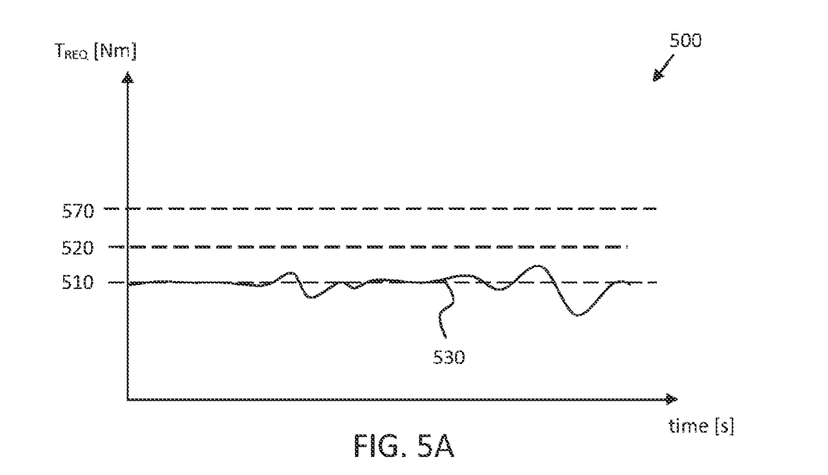
FIGS. 5A-5C are graphs illustrating example braking operations.

FIG. 5A shows a graph 500 of an example operation according to the techniques disclosed herein. The graph shows torque (in Newton-meters) vs. time (in seconds). The VMM 110 determines a total brake torque request 510 for braking a wheel 301 of the vehicle. It is an overall goal of the braking system to deliver this requested braking torque. A system comprising a single brake actuator, such as normal service brake systems comprising a single actuator for each wheel, would control the applied torque to be close to the requested torque value. The total requested brake torque 510 in FIG. 5A is below the brake torque capability 520 of the electrical machine. In this scenario, since the electrical machines can provide the requested torque on its own, the electrical machines are used for braking the wheel without support from the service brake system. The torque applied by the electrical machine is shown by a solid line 530 in FIG. 5A. The electrical machines are also the sole means for wheel slip control, which is why the applied torque 530 varies over time in FIG. 5A.

FIG. 5A also shows a threshold torque level 570. This will be discussed in more detail below in connection to FIG. 5C.

Figure 5B:
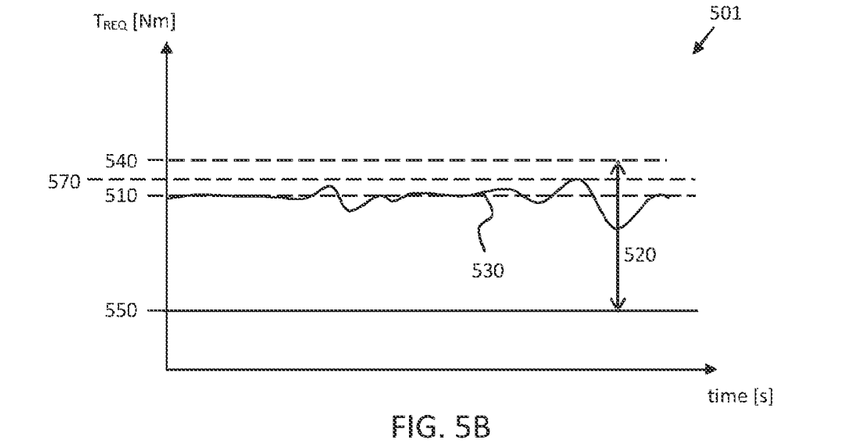

FIG. 5B illustrates another scenario 501 where the total brake torque request 510 exceeds the brake torque capability 520 of the electrical machine 360 but is below the threshold level 570. In this case a baseline brake torque 550 is applied using the service brakes. This baseline brake torque is configured to compensate for the difference between the total brake torque request 510 and the brake torque capability 520 of the electrical machine 360. Slip control is still provided solely using the electrical machines, which is again why the torque 530 applied by the electrical machine varies over time. Thus, advantageously, slip controlled is performed by a single actuator, which simplifies control. At the same time the electrical machines are used as a sole means for slip control also in scenarios where the requested brake torque surpasses the capability of the electrical machine. The base line brake torque level is here shown constant over a time period. However, the baseline brake torque may also be configured as a linearly increasing or decreasing value. Normally, however, the rate of change of the baseline level is below the control bandwidth of the electrical machine control.

Figure 5C:
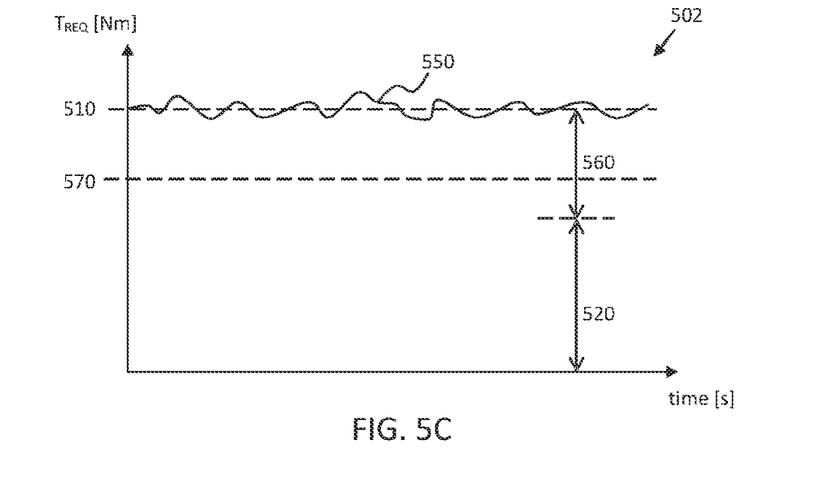

FIG. 5C illustrates a scenario 502 where the total requested brake torque 510 exceeds the threshold value 570. In this case, according to some of the methods disclosed herein, the service brakes are used for providing the total requested torque, and are also used for slip control, which is why the torque 540 applied by the service brakes varies over time in FIG. 5C. The slip control by the electrical machine is then disabled to not interfere with the slip control performed by the service brake system.

There may be a time dependence to the control as noted above, since electric machines may be able to deliver a high peak torque for a limited amount of time, after which period of time a lower continuous operation torque can only be provided. This time period can be used with advantage in the disclosed techniques, since it allows the service brake system to be introduced at the baseline torque in a smooth manner, i.e., gradually increased up to the baseline torque. Once the baseline torque has been introduced, the electric machine can back off away from the peak torque levels.

Figure 6:
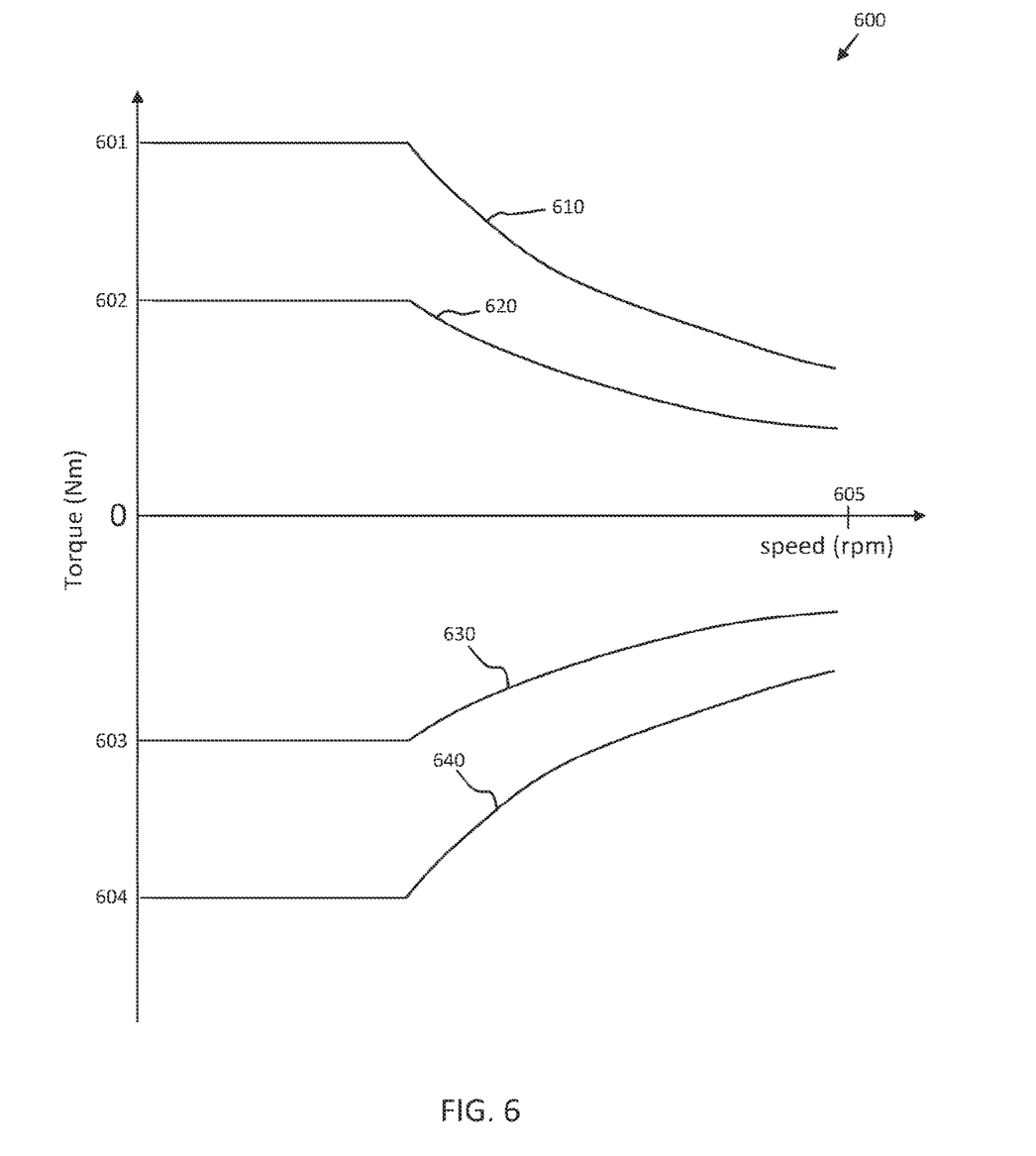
FIG. 6 is a graph illustrating torque capability vs engine speed.

FIG. 6 is a graph showing example torque capabilities 600 of an electrical machine in dependence of engine speed for propulsion (positive torque) and braking (negative torque) operations. These types of capabilities can be communicated to the vehicle control system as part of the capability messages discussed in connection to, e.g., FIG. 3. Similar curves can of course be drawn also for reversing (negative engine speeds). Depending on various design parameters of the electrical machine and the surrounding vehicle systems, such as cooling systems, design of overload resistors, and component robustness in general, most electrical machines can be associated with a continuous torque capability that can be maintained over a longer period of time and a peak torque capability which is a torque level that can only be generated for a limited period of time before, e.g., engine temperature reaches a critical level.

This means that, for short but intensive propulsion and braking situations, the VMM 100 has the option to temporarily overload the electrical machines up to a known overload level and to maintain load at this level for a limited period of time. This in turn means that the design of the transmission system can be simplified or even reduced down to a single fixed gear transmission, which is an advantage.

This time period where peak torque can be provided also simplifies introduction of the service brake baseline torque in a controlled manner.

Figure 7:
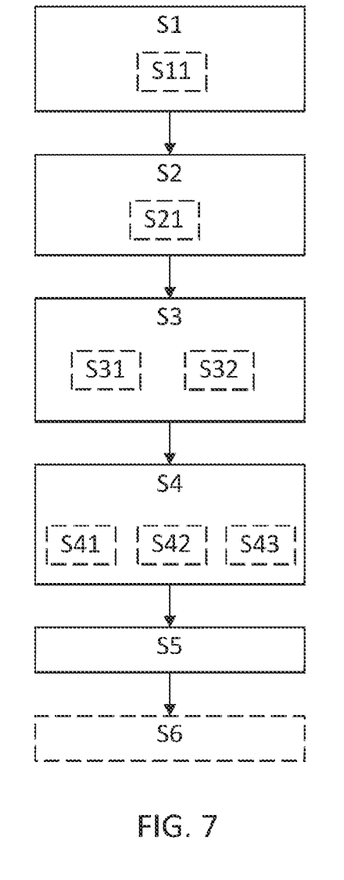
FIG. 7 is a flow chart illustrating methods.

FIG. 7 is a flow chart which summarizes the methods discussed above. There is illustrated a method for controlling a vehicle brake system 300 of a heavy duty vehicle 100. The brake system comprises a service brake system 310, 340 and an electrical machine brake system 350, 360, as exemplified in FIG. 3.

The method comprises determining S1 a total brake torque request 510 for braking a wheel 301 of the vehicle 100. This determining can, for instance, be performed by a force allocation module in a VMM, which acts in response to requests from a higher layer control function. The brake torque request can optionally also be associated with a time duration for which braking is desired, which allows the control unit 110 to determine if peak torque can be used for the duration of the braking operation or if an extended time period torque is needed.

The method also comprises obtaining S2 a brake torque capability 520, CAP $EM_i$ of the electrical machine 360. This brake torque capability may, e.g., depend on a battery state and on whether an overload resistor arranged to absorb surplus energy from regenerative braking has been added to the electrical machine system and if so what its specifications are. Also, as noted above, the brake torque capability may comprise a peak torque capability which can only be delivered for a limited period of time, and a continuous torque capability which can be generated for longer periods of time.

The electrical machine system, including cooling and the like, may be dimensioned to handle delivery of continuous torques 630 sufficient for long downhill driving by the addition of a resistor to absorb surplus energy from regenerative braking. The electrical machine may also be dimensioned to handle peak torques sufficient for hard braking during limited periods of time. These capabilities, i.e., peak and continuous torque capabilities along with relevant time windows, can be communicated to the control unit via the capability message 380.

FIG. 6 shows an example positive maximum torque capability 610 and an example positive continuous torque capability 620 which is smaller than the peak capability but which on the other hand can be maintained for longer periods of time. For reasonably low engine speeds, say below a few thousand rpm, the machine can provide a torque value 602 over longer time periods, but may deliver significantly higher torques 601 during limited time periods, such as 10-30 seconds. Both torque values 610, 620 tend to drop with engine speed up to some maximum engine speed 605. An electrical machine may be associated with a maximum engine speed 605 of about 10000 rpm or so.

A similar situation is seen for negative torques, where the machine has the capability to deliver a continuous negative torque 630 for an extended period of time which has a smaller magnitude 603 compared to a peak negative torque value 604. The peak torque 640 which can be generated for braking is, however, not possible to maintain for an extended period of time. The magnitude of the two negative torques also tend to decline with engine speed.

Consequently, it is possible to overload an electrical machine for limited periods of time. The control unit 110 can use this information during vehicle control. In particular, the VMM 110 can compare the total brake torque request and associated total brake torque request duration to the peak torque capability of the electrical machine and the duration associated with the peak torque, and determine if the brake torque request can be met or not based on the capability of the electrical machine and on the time duration associated with the brake request. This allows introduction of the baseline torque by the service brakes in a controlled and timely manner.

A similar 'peak' and 'continuous' brake torque capability with associated time periods can of course also be communicated from the service brakes to the VMM 110.

The capability may also reflect road conditions, such as current friction and also the state of the tyre. The system now knows what torque that should be delivered, and also how much torque that can be provided by the electrical machine.

The method further comprises determining S3 if the total brake torque request 510 exceeds the brake torque capability 520 of the electrical machine 360. If the total brake torque request 510 exceeds the brake torque capability 520 of the electrical machine 360 but is below a threshold level 570, the method applies S4 a baseline brake torque 550 by the service brake system. This baseline brake torque is configured to compensate for a difference between total brake torque request 510 and brake torque capability 520 of the electrical machine 360, which means that the service brake torque is added as a given torque-controlled level in order for the combination of electrical machine and service brake to reach the total requested brake torque level. The baseline brake torque level may be constant over a time period, or linearly increasing or decreasing. The rate of change of the baseline brake torque level is preferably determined in dependence of a control bandwidth of the electrical machine deceleration arrangement. Determining S3 if the total brake torque request 510 exceeds the brake torque capability 520 of the electrical machine 360 may also comprise determining if the requested brake torque duration exceeds the duration associated with the peak torque capability of the electrical machine.

Notably, the method comprises controlling S5 wheel slip by the electrical machine brake system 350, 360 in case the total requested brake torque is below the threshold level. This simplifies slip control, since only one slip control system is active at the same time. Thus, no joint slip control system is necessary by the proposed technique.

There are at least three possibilities for implementing a slip control loop for the EM 360, which options can be combined or used separately. In option 1, with reference to FIG. 3, the slip controller is implemented or at least partly comprised within the VMM. Torque requests are then sent to the WEM $EM_i$ (see, e.g., 350 in FIG. 3). In option 2, the main slip controller for the EM 360 is comprised in the WEM $EM_i$ 350, and the VMM sends torque request and slip limits (as it does for the service brakes 310/340). In option 3, the VMM does 'part of the' EM slip control loop and sends wheel speed requests to the WEM EMi 350 when the slip limit is reached. This way the WEM $EM_i$ 350 can do fast control on the electrical machine rotational speed, but the actual slip calculation is mainly performed within the VMM 110.

According to some aspects, the method comprises braking S42 the vehicle solely by the service brake system 310, 340 and controlling wheel slip by the service brake system 310, 340 in case the total brake torque request 510 is above the threshold level 570. This threshold level may for example correspond to a longitudinal vehicle acceleration smaller than −0.5 g S43. Thus, as long as the total requested brake torque by the VMM 110 is below the threshold level, then the wheel slip control is performed by the electrical machine. This control is possibly performed in combination with a torque-controlled baseline braking by the service system. It is appreciated that the wheel slip control can be performed solely by the electrical machine, or mainly by the electrical machine. For example, in case the total brake torque request is such that torque-controlled baseline braking is applied by the service brakes, different wheel slip limits can be imposed on the electrical machine and on the service brake for a given wheel. The wheel slip limit imposed on the electrical machine may be, e.g., 0.1, while the wheel slip limit imposed on the service brake system can be, e.g., 0.3. These are normally slip limit values set for each wheel device or actuator. They will be configured in dependence of the tyre/road condition the vehicle wheels are experiencing and on the overall acceleration request from higher layers.

This means that wheel slip is mainly handled by the electrical machine, since the electrical machine will react first to a wheel slip. But, in case of severe wheel slip, the service brake will also engage in controlling the wheel slip by reducing the applied baseline brake torque. According to another example the wheel slip control by the service brakes is inactivated when torque-controlled baseline braking is applied, in which case the wheel slip control is handled solely by the electrical machine.

Thus, according to some aspects, in case the wheel slip control is handled mainly by the electrical machine when baseline braking is applied, the wheel slip limit of the service brake system $\lambda_{SBi}$ is configured to be larger than the wheel slip limit of the electrical machine $\lambda_{EMi}$. In other words, the method may comprise configuring S6 a wheel slip limit of the service brake $\lambda_{SBi}$ above a wheel slip limit of the electrical machine $\lambda_{EMi}$.

It is also appreciated that different wheel slip control strategies can be applied for different wheel, or for wheels on different axles. Thus, wheel slip can be handled solely by the electrical machine on the wheel on one axle while some measure of slip control by the service brake system can be applied for the wheels on some other axle.

When the total brake torque request is relatively small, such that it can be handled solely by the electrical machine without support from the service brakes, the baseline brake torque applied by the service brakes is equal to zero. In other words, according to some aspects, the method comprises applying S41 a baseline brake torque 550 equal to zero in case the total brake torque request 510 is below the brake torque capability 520 of the electrical machine 360.

The baseline brake torque 550 is optionally determined S31 as a difference between the total brake torque request 510 and the brake torque capability 520 of the electrical machine 360 with an added margin torque value. According to some aspects, the added margin torque value is between 0.1 and 0.3 times the brake torque capability 520 of the electrical machine 360, and preferably 0.2 times the brake torque capability 520 of the electrical machine 360. This effectively means that the electrical machine does not have to operate at peak torque capacity but will be allowed some range in which it may vary applied torque to perform slip control without exceeding maximum torque capability. According to some aspects, the method comprises determining S11 the total brake torque request 510 in dependence of an estimated surface friction coefficient μ.

As discussed above, according to some aspects, the brake torque capability 520 of the electrical machine 360 is at least partly determined in dependence of a temporary peak torque (640) available from the electrical machine.

According to some other aspects, the method comprises determining S21 the brake torque capability 520 of the electrical machine 360 in dependence of a battery state.

Figure 8:
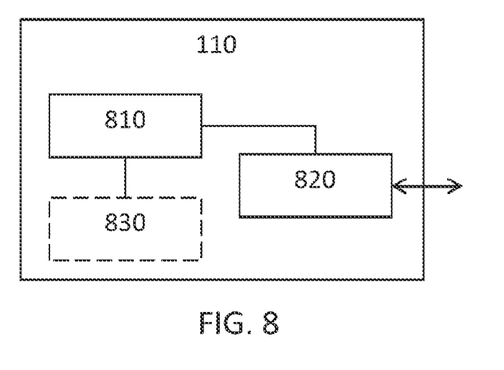
FIG. 8 schematically illustrates a control unit.

FIG. 8 schematically illustrates, in terms of a number of functional units, the components of a control unit 110 according to embodiments of the discussions herein. This control unit 110 may be comprised in the vehicle 100, e.g., in the form of a VMM unit. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 110 to perform a set of operations, or steps, such as the methods discussed in connection to FIG. 10. For example, the storage medium 830 may store the set of operations, and the processing circuitry 810 may be configured to retrieve the set of operations from the storage medium 830 to cause the control unit 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 110 may further comprise an interface 820 for communications with at least one external device such as the WEMs discussed above. As such the interface 820 may comprise one or more transmitters and receivers, comprising analogue and digital components and a suitable number of ports for wireline or wireless communication.

The processing circuitry 810 controls the general operation of the control unit 110, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

FIG. 8 illustrates a control unit 110 for controlling a vehicle brake system 300 of a heavy duty vehicle 100. The brake system comprises a service brake system 310, 340 and an electrical machine brake system 350, 360. The control unit 110 comprises processing circuitry 810 and an interface 820. The processing circuitry 810 is configured to determine a total brake torque request 510 for braking a wheel 301 of the vehicle 100, to obtain a brake torque capability 520, CAP $EM_i$ of the electrical machine 360 via the interface 820, and to determine if the total brake torque request 510 exceeds the brake torque capability 520 of the electrical machine 360. The control unit 110 is configured to apply a baseline brake torque 550 by the service brake system if the total brake torque request 510 exceeds the brake torque capability 520 of the electrical machine 360 but is below a threshold level 570. This baseline brake torque is configured to compensate for a difference between total brake torque request 510 and brake torque capability 520 of the electrical machine 360. The control unit 110 is also configured to control wheel slip by the electrical machine brake system 350, 360.

According to some aspects, the control unit 110 is configured to apply a baseline brake torque 550 equal to zero in case the total brake torque request 510 is below the brake torque capability 520 of the electrical machine 360.

According to some other aspects, the control unit 110 is configured to brake the vehicle solely by the service brake system 310, 340 and to control wheel slip solely by the service brake system 310, 340 in case the total brake torque request 510 is above the threshold level 570.

To summarize, the control unit 110 is arranged to perform the techniques disclosed herein, and in particular those discussed above in connection to FIGS. 5A-5C.

Figure 9:
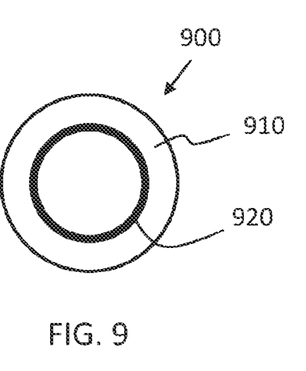
FIG. 9 shows an example computer program product.

FIG. 9 illustrates a computer readable medium 910 carrying a computer program comprising program code means 920 for performing the methods illustrated in FIG. 7 and the techniques discussed herein, when said program product is run on a computer. The computer readable medium and the code means may together form a computer program product 900.

The invention claimed is:

1. A method for controlling a vehicle brake system of a heavy duty vehicle, the brake system comprising a service brake system and an electrical machine brake system, wherein a service brake wheel end module is arranged to control wheel braking by a service brake actuator, an electrical machine wheel end module is arranged to control an electrical machine, and a vehicle control unit is arranged to control operations by the two wheel end modules by sending torque request and slip limits, the method comprising applying wheel-specific slip control strategies by:
configuring a service brake wheel slip limit above a electrical machine wheel slip limit,
determining a total brake torque request for braking a wheel of the vehicle,
obtaining a brake torque capability of the electrical machine,
determining if the total brake torque request exceeds the brake torque capability of the electrical machine, and
controlling braking according to the total brake torque request while keeping wheel slip magnitude below a wheel slip magnitude limit, by:
applying a baseline brake torque by the service brake system if the total brake torque request exceeds the brake torque capability of the electrical machine but is below a threshold level, wherein the baseline brake torque is configured to compensate for a difference between total brake torque request and brake torque capability of the electrical machine,
braking the vehicle solely by the service brake system and controlling wheel slip by the service brake system if the total brake torque request exceeds the predetermined threshold level, while
controlling wheel slip by the electrical machine brake system, while a system slip controller of the service brake system is not active, if the total brake torque request is below the predetermined threshold level, wherein the electrical machine wheel end module modifies the torque request into an applied torque in dependence on current wheel slip and updates the brake torque capability of the electrical machine, wherein the electrical machine reacts to a wheel slip before the service brake wheel slip control, wherein the vehicle control unit sends wheel spy requests to the electrical machine wheel end module when the electrical machine wheel slip limit is breached, and wherein service brake wheel slip control is triggered when the service brake wheel slip limit is breached.

2. The method according to claim 1, wherein the baseline brake torque is determined as a difference between the total brake torque request and the brake torque capability of the electrical machine with an added margin torque value.

3. The method according to claim 2, where the added margin torque value is between 0.1 and 0.3 times the brake torque capability of the electrical machine.

4. The method according to claim 3, where the added margin torque is 0.2 times the brake torque capability of the electrical machine.

5. The method according to claim 1, comprising applying a baseline brake torque equal to zero in case the total brake torque request is below the brake torque capability of the electrical machine.

6. The method according to claim 1, wherein the predetermined threshold level corresponds to a vehicle acceleration smaller than −0.5 g.

7. The method according to claim 1 comprising determining the total brake torque request in dependence of an estimated surface friction coefficient μ.

8. The method according to claim 1 comprising determining the brake torque capability of the electrical machine in dependence of a battery state and/or a resistor size value associated with the electrical machine.

9. The method according to claim 1 comprising configuring a wheel slip limit of the service brake ($\lambda_{SBi}$) above a wheel slip limit of the electrical machine ($\lambda_{Emi}$).

10. The method according to claim 1, wherein the brake torque capability of the electrical machine is at least partly determined in dependence of a temporary peak torque available from the electrical machine.

11. The method according to claim 1, wherein a time dependence is associated with the brake torque capability of the electrical machine, and where the total brake torque request comprises a time duration.

12. A non-transitory computer readable medium carrying a computer program comprising program code for performing the steps of claim 1 when said computer program product is run on a computer or on processing circuitry of a control unit.

13. A control unit for controlling a vehicle brake system of a heavy duty vehicle, the brake system comprising a service brake system and an electrical machine brake system, wherein a service brake wheel end module is arranged to control wheel braking by a service brake actuator, an electrical machine wheel end module is arranged to control an electrical machine, and a vehicle control unit is arranged to control operations by the two wheel end modules by sending torque request and slip limits, the control unit comprising applying wheel-specific slip control strategies by configuring a service brake wheel slip limit above a electrical machine wheel slip limit, processing circuitry and an interface, wherein the processing circuitry is configured to determine a total brake torque request for braking a wheel of the vehicle, to obtain a brake torque capability of the electrical machine via the interface, and to determine if the total brake torque request exceeds the brake torque capability of the electrical machine, wherein the control unit is configured to apply a baseline brake torque by the service brake system if the total brake torque request exceeds the brake torque capability of the electrical machine but is below a predetermined threshold level, and controlling braking according to the total brake torque request while keeping wheel slip magnitude below a wheel slip magnitude limit, wherein the baseline brake torque is configured to compensate for a difference between total brake torque request and brake torque capability of the electrical machine, and wherein the control unit is configured to brake the vehicle solely by the service brake system and to control wheel slip solely by the service brake system in case the total brake torque request is above the predetermined threshold level, while the control unit is configured to control wheel slip by the electrical machine brake system, while a system slip controller of the service brake system is not active, if the total brake torque request is below the predetermined threshold level, wherein the electrical machine wheel end module modifies the torque request into an applied torque in dependence on current wheel slip and updates the brake torque capability of the electrical machine, wherein the electrical machine reacts to a wheel slip before the service brake wheel slip control, wherein the vehicle control unit sends wheel speed requests to the electrical machine wheel end module when the electrical machine wheel slip limit is breached, and wherein service brake wheel slip control is triggered when the service brake wheel slip limit is breached.

14. The control unit according to claim 13, configured to apply a baseline brake torque equal to zero in case the total brake torque request is below the brake torque capability of the electrical machine.

15. A vehicle comprising a control unit according to claim 13.

* * * * *